Dec. 21, 1943.    N. M. KNIGHT    2,337,113
PULP SCREEN
Filed Oct. 22, 1941    5 Sheets-Sheet 1

Inventor.
Nelson M. Knight
by Heard Smith & Tennant.
Attys.

Dec. 21, 1943.   N. M. KNIGHT   2,337,113
PULP SCREEN
Filed Oct. 22, 1941   5 Sheets-Sheet 2

Inventor.
Nelson M. Knight
by Heard Smith & Tennant
Attys.

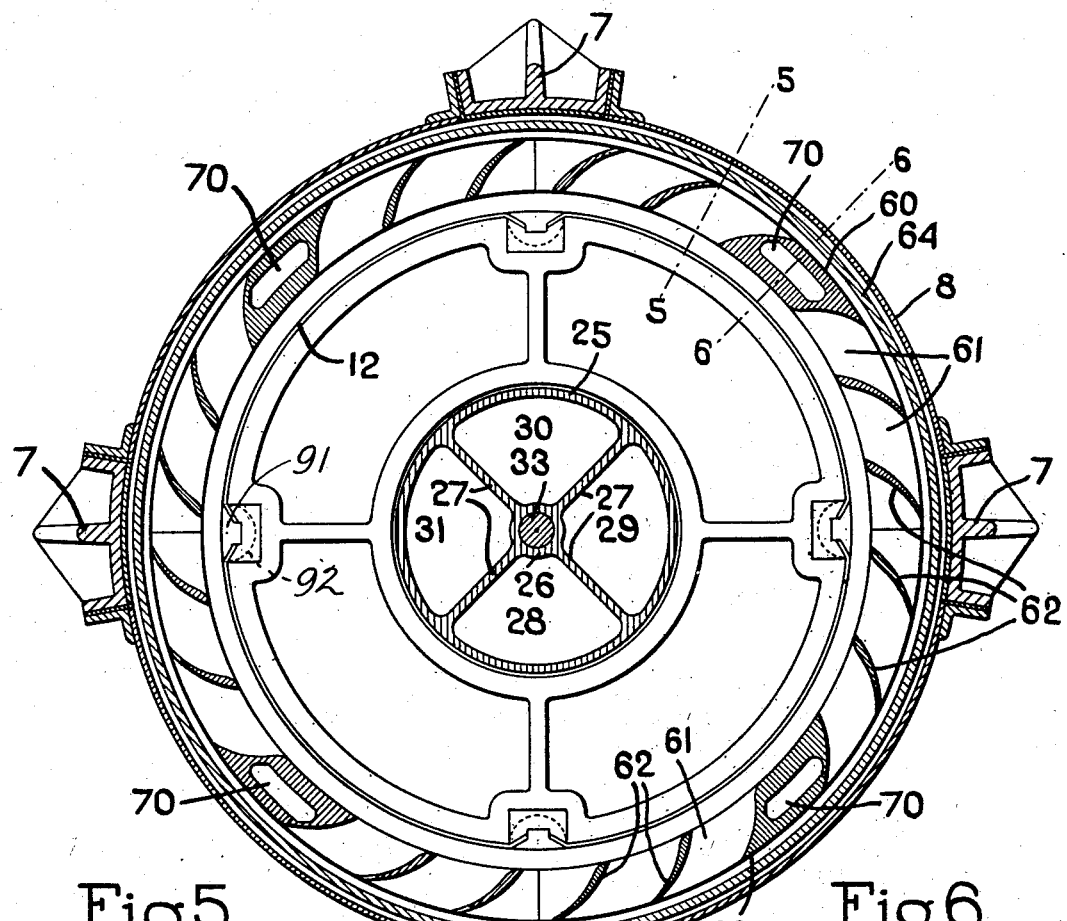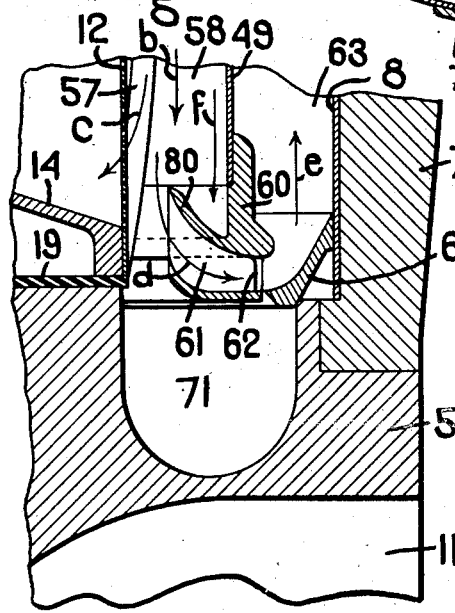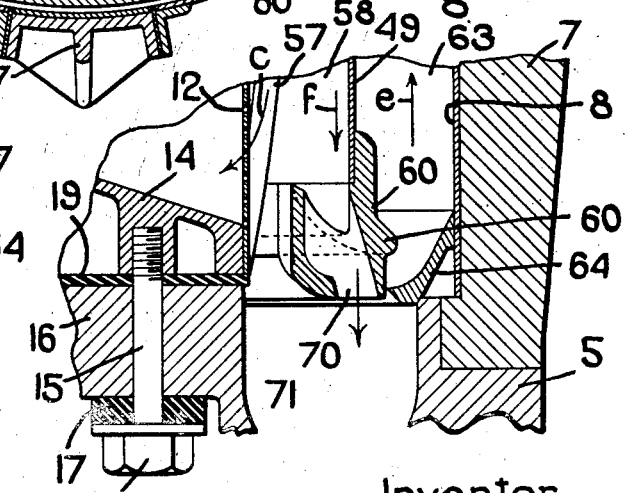

Dec. 21, 1943.   N. M. KNIGHT   2,337,113
PULP SCREEN
Filed Oct. 22, 1941   5 Sheets-Sheet 4

Inventor.
Nelson M. Knight
by Heard Smith & Tennant.
Attys.

Dec. 21, 1943. N. M. KNIGHT 2,337,113
PULP SCREEN
Filed Oct. 22, 1941 5 Sheets-Sheet 5

Inventor.
Nelson M. Knight
by Heard Smith & Tennant.
Attys.

Patented Dec. 21, 1943

2,337,113

UNITED STATES PATENT OFFICE 2,337,113

PULP SCREEN

Nelson M. Knight, Boston, Mass., assignor to Wilfred B. Mathewson, Weymouth, Mass.

Application October 22, 1941, Serial No. 416,081

12 Claims. (Cl. 92—34)

This invention relates to apparatus for so treating material in the form of liquid containing solids in suspension as to separate or extract from the liquid material certain undesirable portions of the solids thus held in suspension. While my invention is adapted to be used in treating a wide variety of suspensions, yet I have chosen to show it herein as it might be used for treating pulp or fibre-water mixture intended for paper-making purposes, for the purpose of separating therefrom the coarse fibres, foreign matter and other undesirable ingredients which are a detriment to the paper-making operation.

I wish it understood, however, that, as stated above, the invention is well-adapted for treating other liquid suspensions for the purpose of separating certain undesirable ingredients therefrom.

One object of the invention is to provide an apparatus for this purpose by which the separation of undesirable ingredients, or what might be termed the "rejects" or "tailings" from the usable portion of the liquid material is accomplished by a combination of centrifugal action and a screening operation, the centrifuging and the screening operatings being so carried out that the material being treated is subjected to both operations simultaneously.

Another object of the invention is to provide a construction in which the centrifuging operation is so carried out that the centrifugal force which is developed thereby tends to direct the rejects or tailings away from the screen, thereby making it much easier to keep the screen clean.

A further object of the invention is to provide an apparatus of this type in which the flotation principle is used in connection with the centrifuging and screening operations for eliminating the portion of the rejects or tailings that are of relatively light specific gravity.

A further object of the invention is to provide an apparatus of this type which embodies a recirculating feature according to which the portion of the material containing the rejects or tailings is subjected to a double centrifuging operation that is very effective in causing a separation of such tailings or waste from the usable portion of the material.

In attaining these objects, I have provided an apparatus comprising a casing, a cylindrical screen within the casing which forms therewith an annular space surrounding the screen, which casing has an inlet through which the material to be treated may be delivered to such annular space and also having an outlet which communicates with the space within the screen, and means in said space to cause the material therewithin to rotate around the screen, whereby the centrifugal force developed within the rotating material will tend to force the coarser and larger particles outwardly away from the screen while allowing the usable portions of the material to pass through the screen.

The apparatus is also provided with means whereby the portion of the material which is thus thrown outwardly away from the screen is caused to recirculate in the casing and to be a second time subjected to the centrifuging action, thereby effecting a more complete separation of the undesirable portion of the material from the usable portion thereof.

In the drawings, wherein I have illustrated a selected embodiment of the invention:

Fig. 4 is a horizontal section on the line 4—4, Fig. 1.

Fig. 5 is an enlarged section on the line 5—5, Fig. 4.

Fig. 6 is an enlarged section on the line 6—6, Fig. 4.

Figure 1:
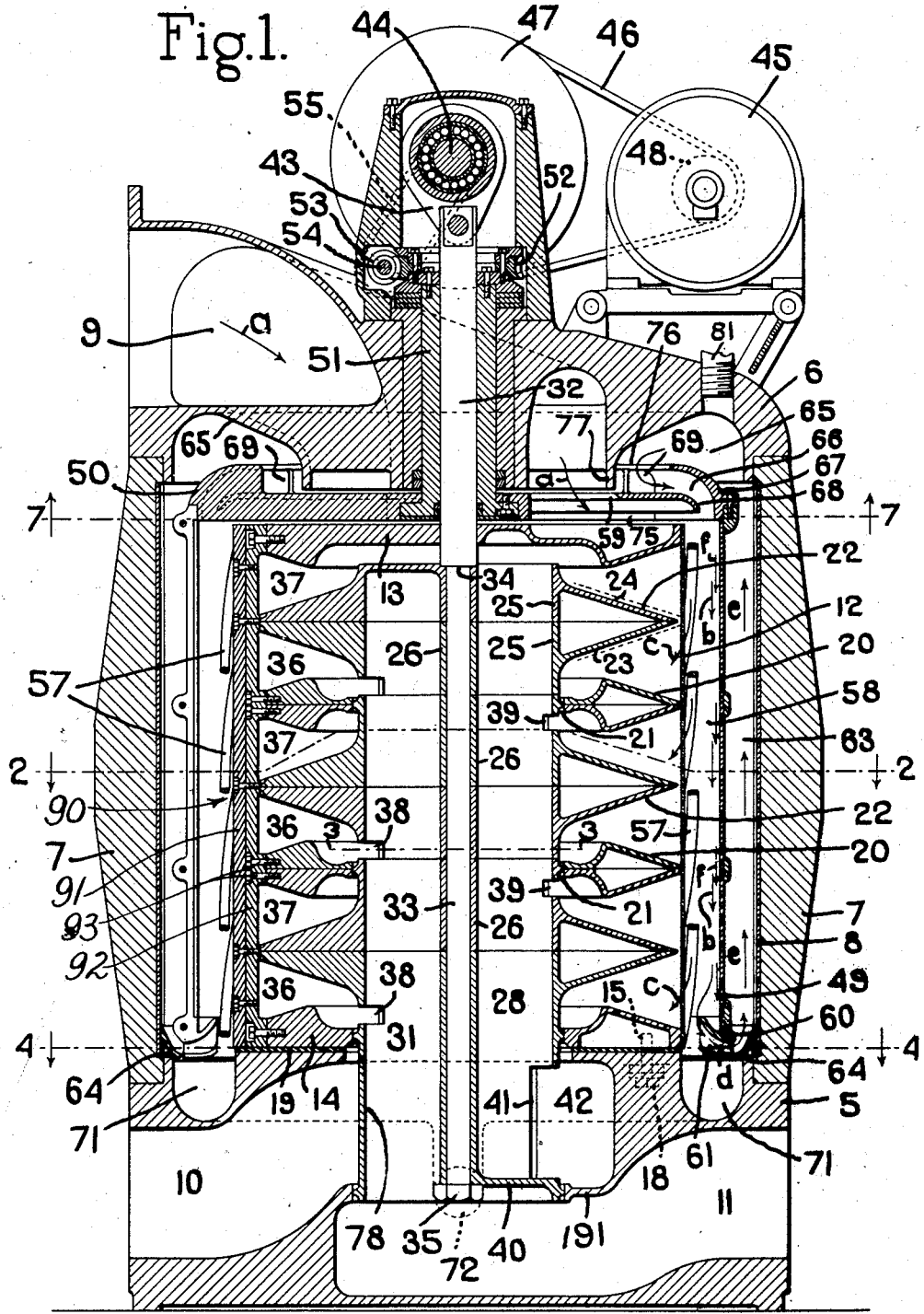
Fig. 1 is a vertical sectional view showing a device embodying the invention, said section being taken on the broken line 1—1, Fig. 2.

The apparatus herein shown comprises a cylindrical casing 3 which is formed with a cylindrical side wall 4, with a base portion 5 and with a cap 6. This casing is provided with four vertical posts 7 extending from the base 5 to the cap member 6, and the side wall of the casing is made up of four wall sheets 8 which are secured at their vertical edges to the posts in any suitable or usual way. The cap member 6 is provided with an inlet opening 9 through which the material to be treated is delivered to the casing, and the base member 5 is formed with two outlet openings 10 and 11 through which the screened material is delivered.

Situated within the casing is a cylindrical screen 12 which is provided at its upper end with an upper head 13 and at its lower end with a lower head 14. The lower head 14 of the screen is secured to the base member 5 by means of anchor bolts 15 which extend through a portion 16 of the base member and are screw-threaded into the lower screen head 14, as best seen in Fig. 6. The upper and lower screen heads 13 and 14 are connected together by posts 90, four such posts being shown. The screen 12 is shown as formed in four sections, each section spanning the space between two adjacent posts 90. Each post 90 comprises the two elements 91, 92 between which the edges of the adjacent screen sections are clamped.

17 indicates cushion members of rubber or similar material which are interposed between the heads 18 of the anchoring bolts 15 and the portion 16 of the base, and 19 indicates a second cushion member which is interposed between the screen head 14 and the base 5. These cushion members 17 and 19 permit a slight vertical vibrating movement of the screen in a manner presently to be described. The screen, however, is held from rotary movement.

Situated within the screen and secured thereto are a plurality of stationary partition members 20 extending transversely across the screen, each partition member having a central opening 21 therethrough for a purpose presently to be described. These partition members 20 are shown as anchored to the posts 90 by bolts 93 (see Fig. 1).

Also situated within the screen are a plurality of pulsating members 22 which alternate with the partition members 20. These pulsating members are given a slight up-and-down vibrating movement as shown by the full and dotted lines in Fig. 1 for the purpose of pulsating the pulp or other material during the screening operation.

Figure 2:
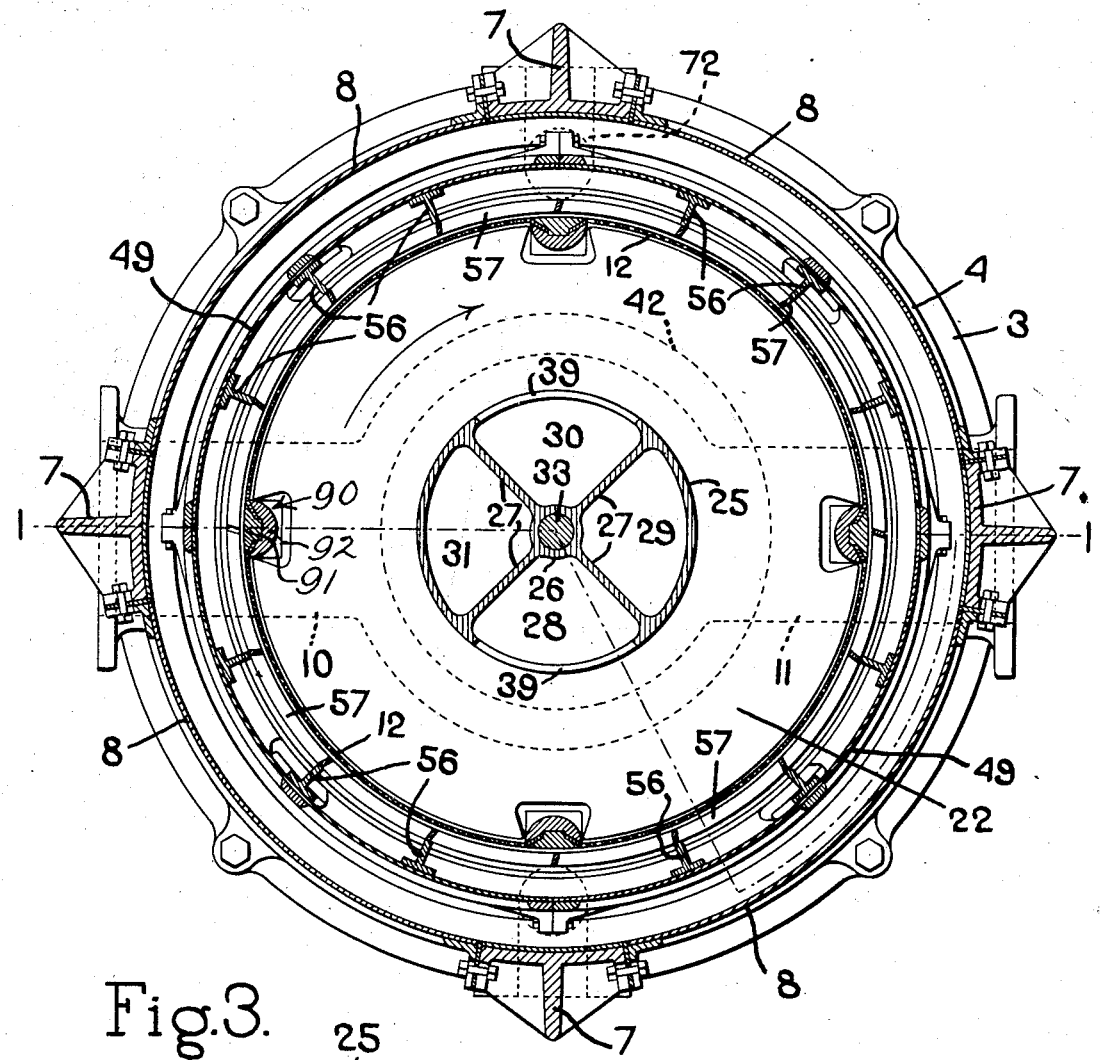
Fig. 2 is a horizontal section on the line 2—2, Fig. 1.
Figure 3:
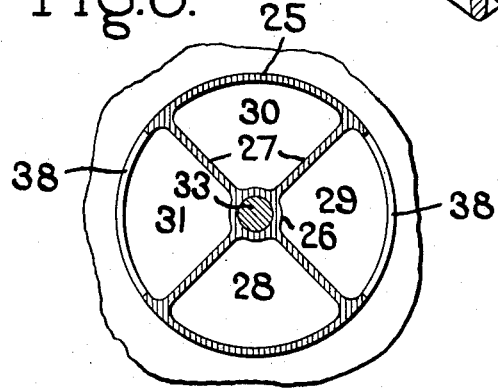
Fig. 3 is a fragmentary section on the line 3—3, Fig. 1.
Figure 7:
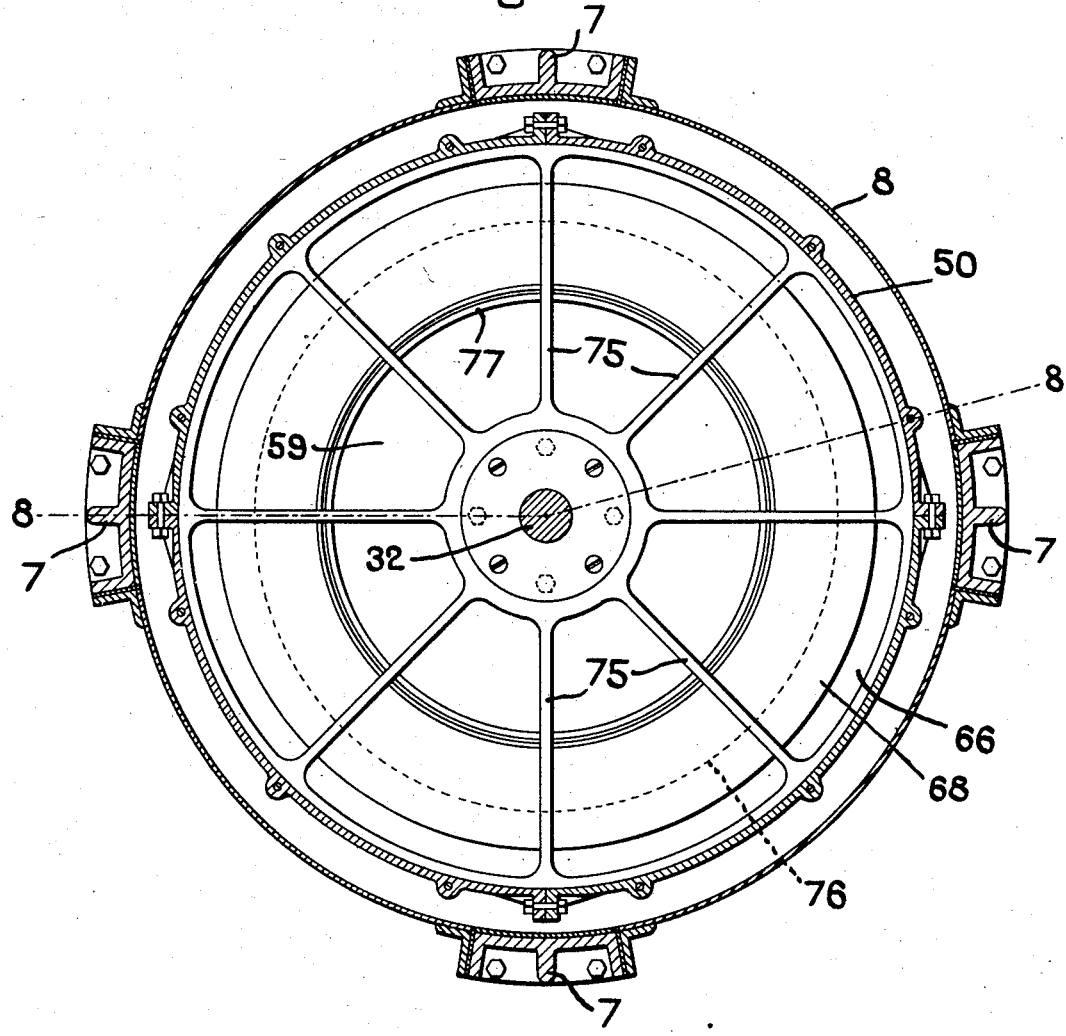
Fig. 7 is a section on the line 7—7, Fig. 1, looking upwardly.
Figure 8:
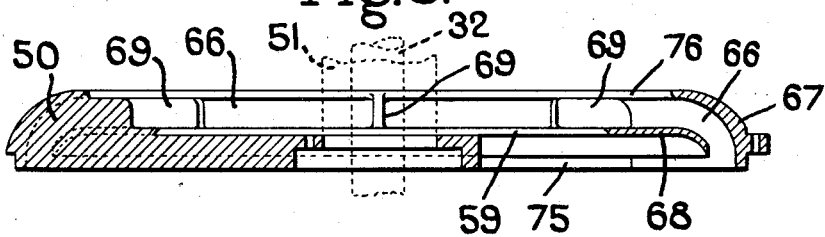
Fig. 8 is a section through the head of the rotor taken on the line 8—8, Fig. 7.
Figure 9:
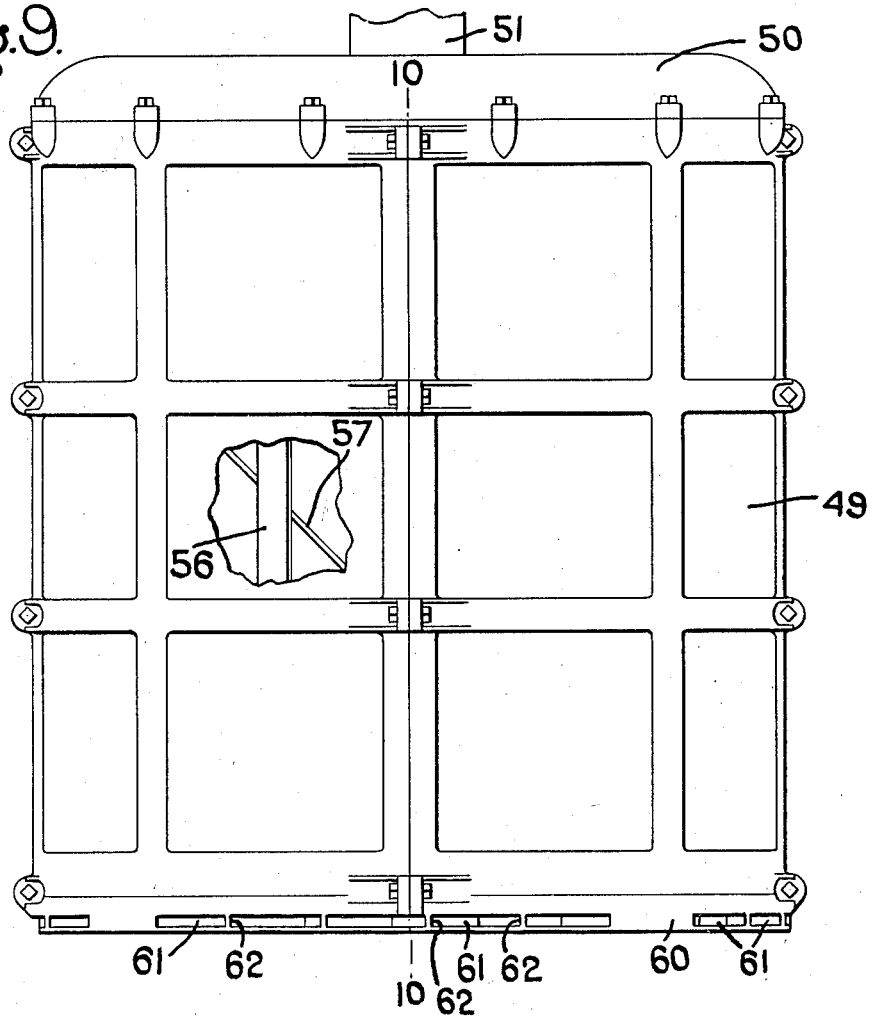
Fig. 9 is a side view of the rotor with a portion broken out.
Figure 10:
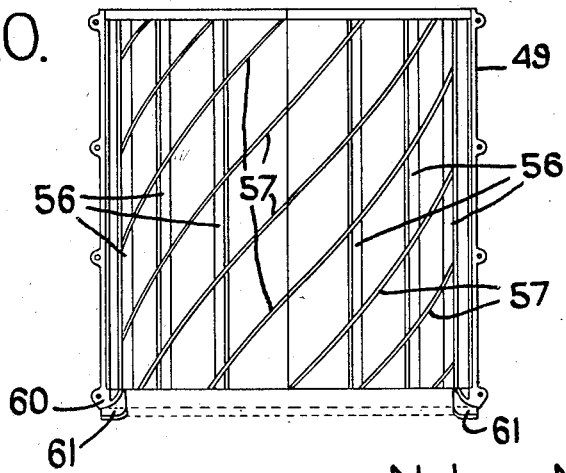
Fig. 10 is a section on a reduced scale on the line 10—10, Fig. 9.

Each pulsating member is shown as formed in two sections 23, 24, and each section is provided with a central cylindrical flange 25 and with a hub portion 26 that is connected to the cylindrical flange by radial webs 27, as shown in Figs. 2, 3 and 4. These webs 27 extend the full vertical dimension of the cylindrical flange 25, and the construction is such that when the pulsating members are assembled, the flanges 25 of the sections engage each other, and these flanges, together with the webs 27, provide four continuous vertical passages for compartments 28, 29, 30, and 31 that extend from the top of the upper pulsating member through the lower pulsating member.

These pulsating members are all mounted on a vertically extending shaft 32. The lower section 33 of the shaft is reduced somewhat in diameter and extends through the hub portions 26 of all of the sections 23, 24 of the pulsating elements. The hub 26 of the upper section of the top pulsating member 22 rests against a shoulder 34 with which the shaft 32 is provided, and a clamping nut 35 on the lower end of the shaft serves to clamp all of the pulsating member sections together, thereby forming a pulsating unit. The cylindrical flanges 25 of this unit fit within the openings 21 in the stationary partitions 20.

The cylindrical flange 25 of the lower section 23 of the bottom pulsating member 22 is extended, as shown at 78, for a considerable distance into the base 5, the extension 78 terminating at but extending through the partition 191 forming part of the base 5 and which separates the two outlets 10 and 11, the opening in the partition 191 thus constituting a guide for the lower end of the extension 78. The hub portion 26 of this lower pulsator member section 23 is also extended as well as the webs 27 of said lower section.

The pulsating members 22 of the pulsating unit, together with the stationary partitions 20, serve to divide the space within the screen 12 into a plurality of annular chambers 36, 37, there being a chamber 36 below each pulsating member 22 and the chamber 37 above each pulsating member.

These pulsating members 22 constitute annular flanges extending outwardly from the cylindrical flanges 25, and each pulsating member is widest at its inner end where it joins the cylindrical flange 25 and is narrowest at its outer peripheral edge.

The stationary partitions 20, which extend from the cylindrical flanges 25 to the screen to which they are fixedly secured, are shown as having a minimum thickness at their periphery where they join the screen and a maximum thickness at a point between their outer periphery and their inner edge. The chambers 36 and 37 are thus widest at their outer side adjacent the screen and are narrower at their inner portions adjacent the flanges 25.

The chambers 36 communicate through the ports 38 in the cylindrical flanges 25 with the vertical passages or compartments 29 and 31, and the chambers 37 communicate through other ports 39 formed in the cylindrical flanges 25 with the other vertical passages or compartments 28 and 30. The vertical passages 31 and 29 communicate directly with the outlet 11, but communication between the passages 28 and 30 with the outlet 11 is closed by the horizontal partition 40. The passages 28 and 30, however, communicate through ports 41 with an annular chamber 42 formed in the base 5 and which, in turn, communicates with the outlet 10. Hence the two vertically extending compartments 31 and 29 communicate with the outlet 11, while the other two vertically extending compartments 30 and 28 communicate with the outlet 10.

As stated above, the pulp or other material to be treated enters the casing through the inlet 9 and is delivered thereby into the annular space between the screen 12 and the casing wall 8, and ultimately the usable portion of the pulp or other material flows through the screen into the chambers 36, 37, and from thence into the passages 28, 29, 30 and 31 from which it is delivered to the outlets 10 and 11.

Means are provided for vibrating the shaft 32 in a vertical direction, thereby to give the pulsating members 22 a vertical vibratory movement, as shown by the dotted lines in Fig. 1. For this purpose, the shaft 32 is connected at its upper end to an eccentric 43 which is actuated by an eccentric portion of a driving shaft 44, the latter being connected to a suitable motor 45 by means of a transmission belt 46 which extends around a driving pulley 47 on the shaft 44 and also around another pulley 48 on the motor shaft.

This vibratory motion of the pulsating members 22 serves in a well-known manner to keep the screen 12 from being clogged.

As the pulsating members move downward to the lower dotted line position, Fig. 1, the pulp or other material in the chambers 36 will be subjected to compression while the pressure will be relieved on the pulp or other material in the chamber 37. On the other hand, the upward movement of the pulsating members to the upper dotted line position produces an increased pressure on the pulp or other material in the chambers 37 and a reduction of pressure on the material in the chambers 36. This pulsating movement with its accompanying varying pressures in the chambers 36, 37, causes the pulp or other material to surge back and forth through the screen to a certain extent during its forward flowing movement from the inlet to the outlet, and such pulsating or surging movement of the pulp tends to keep the screen from becoming clogged.

In accordance with my invention, a centrifuging device is provided in the annular space between the screen and the casing wall 8 by which the material therein is subjected to centrifugal action which cooperates with the screen in separating the heavy particles, foreign matter, and unusable portions of the material from the usable portion, which latter passes through the screen 12 into the chambers 36, 37. This centrifuging device is shown as in the form of a rotor comprising a cylindrical wall 49 which surrounds the screen 12 and is secured at its upper end to a rotating head 50, the latter being, in turn, secured to a sleeve 51 through which the shaft 32 extends, and which, in turn, is rotatably mounted in bearings carried by the cap member 6. The upper end of the sleeve 51 has a worm gear 52 secured thereto which meshes with and is driven by a worm 53 carried on a shaft 54 that is connected to and driven from the shaft 44 by a suitable sprocket chain or belt 55. The cylindrical wall 49 of the rotor divides the space between the screen and the casing into two annular chambers 58 and 63, 58 constituting an inner annular chamber on the inside of said wall and 63 constituting an outer annular chamber on the outside of said wall.

The head 50 is formed with an outer rim portion 67 to which the cylindrical member 49 is secured and with an annular deflector member 68 spaced from the rim 67 but connected therewith by radially arranged blades or webs 69. The annular deflector portion 68 is formed with an opening 59 through which the unscreened pulp flows in passing from the inlet 9 to the annular space between the screen and the casing. The rim portion 67 of the head is also formed with an opening 76 somewhat larger than the opening 59, the purpose of which will presently be described.

The cap member 6 is formed with a depending annular flange 77 which depends through the opening 76 and extends nearly to the deflector member 68, said flange 77 serving to direct the incoming pulp through the opening 59 and into the space beneath the head rather than into the annular space 66.

The under side of the head is formed with radial impeller blades 75 which act on the pulp as it flows into the space beneath the head and serves to force the pulp outwardly over the screen head 13, and the deflector plate 68 serves to deflect such outwardly flowing pulp into the space 58 between the screen and the rotor 49.

This rotary member or shell 49 is formed on its inner surface with a plurality of vertically extending bars or blades 56 and secured to the inner edges of such bars or blades are a plurality of spiral blades 57. These latter blades closely encircle the screen but do not have actual contact therewith.

The blades 56 and 57 transmit the rotary motion of the rotor 49 to the pulp or other material situated in the annular chamber 58 between the screen and the rotor, thereby causing such material to rotate around the screen with the rotor. The centrifugal force which is developed in the material by its rotation in the space 58 tends to separate the heavier and larger particles from the finer particles so that the coarse or heavier particles, which constitute the portion of the material which it is desired to separate from the usable portion, are thrown outwardly toward the wall of the rotor 49, while the usable portion of the pulp or other material remains adjacent the screen 12.

In the operation of these machines, the head at the inlet is always greater than at the outlet so that there is a natural flow of the material by gravity from the inlet to the outlet. The rotor comprising the cylindrical wall 49 rotates in a clockwise direction when viewing the apparatus from above as seen by the arrow in Fig. 2, and the spiral shape of the blades 57 serve to augment this natural gravitational flow of the material.

The combined action of the centrifuge and the screen in separating the waste or tailings from the usable portion of the material is illustrated by the arrows indicated at a, b, and c, in Fig. 1. The arrows a indicate the flow of the unscreened pulp or other material into the inlet 9, and from the inlet through the opening 59 in the head 50 to the annular chamber 58 between the screen and the rotor wall 49. As the material passes through the head 50, the blades 75 of said head tend to throw the material outwardly in a radial direction so that it is delivered into said annular chamber 58. As the material enters such chamber, it begins its whirling motion around the screen due to the action of the blades 56 and 57 thereon, and as the material travels downwardly in the annular chamber 58, the heavier portions are thrown by centrifugal force outwardly toward the wall 49 of the rotor and move downwardly, as indicated by the arrows b. The usable portion of the material travels downwardly on the screen side of the chamber 58, and there is a continual flow of this usable portion through the screen into the chambers 36, 37, as indicated by the arrows c.

The centrifugal force thus developed by the rotor 49 tends to keep the heavy coarse particles away from the screen and thus prevents the screen from being clogged thereby. The spiral blades 57 also have a screen-cleaning effect, and the pulsating of the pulp or other material by the action of the pulsating members 22 is another factor which tends to keep the screen clean.

At the lower end of the rotor wall 49 is a ring 60 which is provided with transverse passages 61 separated by the inclined webs 62, as shown in Fig. 4. These webs constitute impeller blades which throw the material entering the passages 61 outwardly so that the action of these impeller blades is to cause a flow of the material from the lower end of the inner annular chamber 58 through the passages 61 into the lower end of the outer annular chamber 63 between the rotor wall 49 and the casing wall 8. At the lower end of the casing wall there is located a deflector ring 64 which deflects the material passing through the passages 61 upwardly. The arrows d indicate the flow of the material through the passages 61 into the outer annular chamber 63. The material which is thus delivered from the inner annular chamber 58 to the outer annular chamber 63 by the impeller blades 62 contains the coarser waste material, and some of the usable material. The continuous delivery of such material through the passages 61 by the impeller blades 62 causes an upward flow of the material through the outer annular chamber 63, as indicated by the arrows e. This material is delivered into an annular chamber 65 formed in the under side of the cap member 6, and from said chamber this material flows through the opening 76 into the passage 66 between the rim 67 of the head and the deflector flange 68. The radial impeller blades 69, extending radially of this annular passage 66, serve to force the material outwardly through the passage 66 and deliver it into the upper end of the inner annular chamber 58 adjacent the wall 49 of the rotor, and at the same time to produce a reduced pressure in the outer annular chamber 65. Such reduced pressure, together with the action of the impeller blades 62 at the lower end of the rotor wall 49, maintains the circulation of the material upwardly in the outer annular chamber 63.

This material which thus flows upwardly through the outer annular space 63, is, therefore, subjected to a second centrifuging action after it is discharged from the passages 66, which is additionally effective in separating the coarse undesirable ingredients from the fine and usable portion of the material. The material moving upwardly in the annular space 63 will be subjected to its second centrifuging action during its flow through the passage 66, and, therefore, even while the material is travelling through said passage, there will be a tendency for the coarser heavy particles to be thrown outwardly against the outer wall of the passage, while the usable portion of the material will tend to travel along the inner side of the passage 66.

It will be noted that the material which is circulated upwardly through the annular chamber 63, as indicated by the arrows e is delivered from the passage 66 into the annular chamber 58 closely adjacent the wall of the rotor 49, while the unscreened pulp which is delivered into the chamber 58 from the inlet opening is delivered into said chamber adjacent the screen.

This material which is thus delivered to the outer portion of the space 58 from the annular passage 66 is subjected to a second centrifuging action as it travels downwardly in said space 63, and during this time the larger and heavier particles are forced outwardly against the rotor 49.

Such heavy unusable particles travel downwardly in the space 58 closely adjacent the wall 49, as shown by the arrows f.

The ring 60 at the bottom of the rotor is formed with the upwardly directed lip 80 and is also formed with a plurality of vertical passages 70 which open into an annular sump 71 formed in the base 5. The waste material which thus flows downwardly adjacent the wall of the rotor, as indicated by the arrows f, passes into the valley behind the upturned lip 80, as shown in Figs. 5 and 6 and then finds its way through the openings 70 into the sump 71. The sump 71 is provided with a tailings outlet 72 through which the waste material and tailings are delivered from the machine.

Sometimes the material travelling upwardly through the annular chamber 63, as indicated by the arrows e, contains more or less very light waste material which will gather on the top of the material filling the chamber 65 and may remain in the upper portion of the chamber.

I have provided an outlet 81 through the cap, through which this light waste material may be floated off and thus separated from the usable material by the flotation process.

From the above description, it will be seen that the separation of the waste or tailings from the usable or acceptable portion of the pulp is accomplished by a combined centrifuging and screening action, and it will further be seen that the centrifuging action is so carried on that it tends to force the waste or tailings away from the screen instead of toward the screen, and thus the centrifuging action serves not only to assist in the separation of the waste and tailings for the usable portion of the pulp but also assists in keeping the screen clean.

It will further be seen that a factor in the separation of the waste and tailings from the usable portion of the pulp is the flotation operation, by which the light material is floated off through the discharge opening 81.

While I have referred to the apparatus as operating to screen pulp, yet, as stated above, I desire to make it clear that my invention is equally applicable for treating other material in the form of suspensions, and, therefore, I do not wish to be limited to its use as a pulp screen.

I claim:

1. An apparatus for screening pulp comprising a casing, a cylindrical screen within the casing, said casing having an inlet at its upper end through which the material to be screened is delivered to the space between the screen and the casing and also having an outlet at its lower end for the material passing through the screen, means to give the unscreened material in said space a rapid rotary motion about the screen whereby the tailings and heavy particles are thrown outwardly away from the screen by centrifugal force while the acceptable portion of the pulp flows inwardly through the screen, and means to withdraw such tailings and heavier particles from the lower end of said space and deliver them to the upper end thereof.

2. A pulp screen comprising a casing, a vertical cylindrical screen within the casing, a cylindrical rotor concentric with the screen and exterior thereto, said rotor having a cylindrical wall which divides the space between the screen and the casing into an annular inner chamber and an annular outer chamber, said casing having in its upper end an inlet through which unscreened pulp is delivered to the inner annular chamber and also having in its lower end an outlet for the screened pulp which passes inwardly through the screen, means to rotate the rotor and thereby cause the pulp in the inner annular space to rotate about the screen, whereby the centrifugal force thus developed forces the heavy particles outwardly toward the rotor wall, and means to recirculate the portion of the pulp containing such heavier particles upwardly through the outer annular space and back into the inner annular space.

3. A pulp screen comprising a casing, a vertical cylindrical screen within the casing, a rotor having a cylindrical wall concentric with the screen and exterior thereto, said wall dividing the space between the screen and the casing into an annular inner chamber and an annular outer chamber, said casing having in its upper end an inlet through which unscreened pulp is delivered to the inner annular chamber and also having in its lower end an outlet for the screened pulp which passes inwardly through the screen, means to rotate the rotor and thereby cause the pulp in the inner annular space to rotate about the screen, whereby the centrifugal force thus developed forces the heavy particles outwardly toward the rotor, said rotor having at its lower end radially extending impeller blades which force the pulp in the lower end of the inner annular chamber outwardly into the outer annular chamber and cause it to flow upwardly in said outer annular chamber and back into the inner annular chamber.

4. A pulp screen comprising a casing having an inlet at its upper end and an outlet at its lower end, a vertical cylindrical screen within the casing through which pulp flows inwardly in passing from the inlet to the outlet, a rotor having a cylindrical wall concentric with and exterior to the screen, said wall dividing the space between the screen and the casing into an inner annular chamber and an outer annular chamber, said rotor having a head at its upper end provided with an opening through which pulp flows from the inlet to the inner annular chamber and also provided with an opening forming a communication between the inner and the outer annular chambers, means to rotate the rotor and thereby to cause the pulp in the inner annular chamber to rotate about the screen, thereby developing a centrifugal force tending to throw the heavier particles outwardly away from the screen, said rotor having at its lower end impeller blades which force the pulp in the lower end of the inner chamber into the outer chamber through which it flows upwardly and re-enters the inner annular space through the opening in the head.

5. An apparatus of the class described comprising a casing, a vertically arranged cylindrical screen within the casing, said casing having an inlet through which the material to be screened is delivered to the annular space between the screen and the casing, and also having an outlet for discharge of the material which passes inwardly through the screen, a rotor having a cylindrical wall in said annular space which is spaced from the screen, means to rotate the rotor about its axis, said rotor having vertical blades on its inner face, which, by their action on the material to be screened, causes it to rotate about the screen, thereby developing centrifugal force which tends to throw heavier particles of the material away from the screen and outwardly toward the cylindrical wall of the rotor, and means to withdraw the portion of said material containing such heavier particles from the lower portion of the casing and deliver it to the upper portion thereof.

6. An apparatus of the class described comprising a casing, a vertically arranged cylindrical screen within the casing, said casing having an inlet through which the material to be screened is delivered to the annular space between the screen and the casing, and also having an outlet for discharge of the material which passes inwardly through the screen, a rotor having a cylindrical wall in said annular space, which wall is spaced from the screen, means to rotate the rotor about its axis, said rotor having vertical blades on the inner face of its cylindrical wall, which, by their action on the material to be screened, causes it to rotate about the screen, thereby developing centrifugal force which tends to throw heavier particles of the material away from the screen and outwardly toward said wall, spiral screen-cleaning blades secured to the inner edges of the vertical blades, and means to withdraw the portion of said material containing such heavier particles from the lower portion of the casing and deliver it to the upper portion thereof.

7. A device of the class described comprising a casing, a vertically arranged cylindrical screen within the casing, a rotor having a cylindrical wall encircling the screen and dividing the space between the screen and the casing into an inner annular chamber and an outer annular chamber, said casing having an inlet through which the material to be screened is delivered to the inner annular chamber and also having an outlet for the screened material which passes through the screen, means to rotate the rotor about its axis, said rotor having vertical blades on the inner face of its cylindrical wall which, by their action on the material cause said material to rotate about the screen, and also having spiral blades secured to the inner edges of the vertical blades and serving to clean the screen and to feed the material in the inner annular chamber downwardly, said rotor further having at its lower end impeller blades which force the material in the lower end of the inner annular chamber outwardly into the lower end of the outer annular chamber, there being a communication between said inner and outer annular chambers at the upper end through which the material forced upwardly in the outer chamber is returned to the inner annular chamber.

8. A pulp screen comprising a casing having an inlet and two screened-pulp outlets, a screen located between the inlet and the outlets, means dividing the space between the screen and the outlets into a plurality of separate compartments, part of which compartments communicate with one outlet and the remainder of which compartments communicate with the other outlet, said screen constituting one wall of each of the compartments, and means for pulsating the pulp in the separate compartments, the means by which said space is divided into compartments serving to isolate the pulsations in each compartment from those in an adjacent compartment.

9. A pulp screen comprising a casing, a cylindrical screen in the casing, said casing having an inlet communicating with the space within the casing exterior to the screen and also having two screened-pulp outlets leading from the space enclosed by the screen, means dividing said latter space into a plurality of separate compartments and providing a communication between part of the compartments and one outlet and another communication between the other compartments and the other outlet, and means for pulsating the pulp in the separate compartments, the means by which the space is divided into compartments serving to isolate the pulsations in each compartment from those in any other compartment.

10. A device of the class described comprising a casing having a base, a cylindrical side wall and having a cap member, said base having an outlet for screened material and a cap member having an inlet for material to be screened, a cylindrical screen in the casing between the inlet and the outlet, said screen having a closed upper end, a rotor comprising a head situated between the cap and the screen and a cylindrical partition wall encircling the screen and dividing the space between the screen and the casing side wall into inner and outer annular chambers, said head having an opening through which material entering the inlet is delivered to the inner annular chamber and also having an opening forming a communication between the upper ends of the inner and the outer annular chambers, means to rotate the rotor, thereby causing the material in the inner annular chamber to rotate about the screen, means at the lower end of the rotor to deliver material in the lower end of the inner annular chamber to the lower end of the outer annular chamber and to cause said material to flow upwardly in said outer annular chamber and through the head back into the inner annular chamber, said cap member having a discharge opening through which the lighter portion of the material passing from the outer annular chamber to the inner annular chamber may be discharged.

11. A device of the class described comprising a casing having an inlet at its upper end and an outlet at its lower end, a vertically arranged cylindrical screen within the casing between the inlet and the outlet, said screen having a closed upper end, a rotor having a head situated above the screen and a cylindrical partition wall secured to said head and encircling the screen and dividing the space between said screen and the casing into an inner and an outer annular chamber, the head of the rotor having an opening through which the material to be screened is delivered from the inlet to the inner annular chamber and also having an opening forming a communication between the inner and the outer annular chambers at their upper ends, means to rotate the rotor, thereby to subject the material in the inner annular chamber to a centrifuging action which tends to throw the heavier particles in said material away from the screen and toward the cylindrical partition wall of the rotor, said rotor having at its lower end a ring provided with impeller blades operating to deliver the material in the lower end of the inner annular chamber to the lower end of the outer annular chamber, and the head of the rotor having means to deliver material from the top of the outer annular chamber into the inner annular chamber, said casing having an annular sump below the inner annular chamber, and said ring having vertical openings through which the refuse accumulating on the inner face of the rotor may be delivered into said sump.

12. An apparatus for screening pulp stock comprising a casing, a vertically arranged cylindrical screen within the casing, said casing having at its upper end an inlet through which unscreened pulp is delivered to the space between the screen and the casing and also having at its lower end an outlet for the screened pulp passing through the screen, means acting on that portion of the pulp to be screened which immediately surrounds the screen to give such portion of the material a rapid rotating motion about the screen whereby the tailings and heavier particles are thrown outwardly away from the screen by centrifugal force while the acceptable portion of the pulp flows inwardly through the screen, and means to withdraw such tailings and heavier particles from the lower portion of said space and deliver them to the upper portion thereof at a point where they commingle with the unscreened material that is delivered through the inlet opening.

NELSON M. KNIGHT.